(12) United States Patent
Nishi

(10) Patent No.: US 9,146,176 B2
(45) Date of Patent: Sep. 29, 2015

(54) THERMOSTAT FAILURE JUDGMENT DEVICE

(75) Inventor: Takayuki Nishi, Tokyo (JP)

(73) Assignee: HINO MOTORS, LTD., Hino-shi (JP)

( * ) Notice: Subject to any disclaimer, the term of this patent is extended or adjusted under 35 U.S.C. 154(b) by 96 days.

(21) Appl. No.: 13/991,229

(22) PCT Filed: Dec. 14, 2011

(86) PCT No.: PCT/JP2011/006962
§ 371 (c)(1),
(2), (4) Date: Jun. 3, 2013

(87) PCT Pub. No.: WO2012/081238
PCT Pub. Date: Jun. 21, 2012

(65) Prior Publication Data
US 2013/0253758 A1    Sep. 26, 2013

(30) Foreign Application Priority Data

Dec. 17, 2010  (JP) ................. 2010-281864

(51) Int. Cl.
| | |
|---|---|
| *G01M 15/04* | (2006.01) |
| *F02D 41/22* | (2006.01) |
| *F01P 11/16* | (2006.01) |
| *F02M 25/07* | (2006.01) |
| *G05B 23/02* | (2006.01) |

(52) U.S. Cl.
CPC ............... *G01M 15/04* (2013.01); *F01P 11/16* (2013.01); *F02D 41/222* (2013.01); *F02M 25/07* (2013.01); *G05B 23/0235* (2013.01)

(58) Field of Classification Search
CPC ... F01P 11/16; F01P 2025/30; F01P 2025/31; F01P 2025/32; F01P 2025/33; F01P 2025/34; F01P 2025/36; F01P 2025/42; F01P 2025/44; F01P 2025/46; F01P 2025/48; F01P 2025/52; F01P 2025/62; F01P 2025/64; F01P 2025/66; F02D 41/222; F02D 41/0045; F02D 41/0047; F02D 41/005; F02D 41/0052; F02D 41/0055; F02D 41/0057; F02D 41/006; F02D 41/0062; F02D 41/0065; F02D 41/0072; F02D 41/0077; F02D 2041/0067; F02D 2041/007; F02D 2041/0075; G01M 15/04; G05B 23/0235; F02M 25/0702; F02M 25/0726; F02M 25/0727; F02M 25/0728; F02M 25/0729; F02M 25/073; F02M 25/0731; F02M 25/0732; F02M 25/0734; F02M 25/0735; F02M 25/0376; F02M 25/0737; F02M 25/0738
USPC ........... 701/29.7, 30.2, 30.3, 30.5, 30.8, 31.1; 73/114.68
See application file for complete search history.

(56) References Cited

U.S. PATENT DOCUMENTS

| | | | |
|---|---|---|---|
| 6,200,021 B1* | 3/2001 | Mitsutani et al. | 374/1 |
| 6,880,497 B1* | 4/2005 | Avery et al. | 123/41.12 |
| 7,260,468 B2* | 8/2007 | Durand et al. | 701/101 |
| 8,056,544 B2* | 11/2011 | Webb et al. | 123/568.12 |
| 2003/0074117 A1 | 4/2003 | Oki et al. | |

FOREIGN PATENT DOCUMENTS

| | | |
|---|---|---|
| JP | 2003 120398 | 4/2003 |
| JP | 2003 278544 | 10/2003 |
| JP | 2008 111414 | 5/2008 |

OTHER PUBLICATIONS

International Search Report Issued Mar. 13, 2012 in PCT/JP11/006962 Filed Dec. 14, 2011.

* cited by examiner

*Primary Examiner* — Jerrah Edwards
(74) *Attorney, Agent, or Firm* — Oblon, McClelland, Maier & Neustadt, L.L.P.

(57) ABSTRACT

A failure judgment device for a thermostat 16 arranged in a circulation passage 13 of cooling water 12 in an engine 1 includes a water-temperature sensor 18 for detection of a temperature of cooling water 12 having passed through the engine 1, and a controller 19 which monitors rise in temperature of the cooling water 12 at cold startup by a detection signal 18*a* inputted from the water-temperature sensor 18 and which calculates a predicted water temperature in the engine 1 as from beginning of the startup to judge failure of the thermostat 16 when the predicted water temperature reaches a valve opening temperature of the thermostat 16 with the temperature of the cooling water 12 being not beyond a threshold value.

1 Claim, 3 Drawing Sheets

THERMOSTAT FAILURE JUDGMENT DEVICE

TECHNICAL FIELD

The present invention relates to a thermostat failure judgment device.

BACKGROUND ART

Generally, a cooling system for an engine in a vehicle has a cooling-water circulation passage with a thermostat. When cooling water is low-temperature at cold startup, the thermostat operates to close the cooling-water circulating passage between an engine and a radiator and open a water passage for returning of the cooling water from the engine to the engine not by way of the radiator, thereby preferentially warm up the engine through circulation of the cooling water not by way of the radiator.

As is well-known in the art, in this kind of thermostat, wax filled in a casing melts as the cooling water becomes high-temperature; and expansion of the wax due to the melting thereof causes a valve to open through a needle, a spring or the like. The operation is conducted on the basis of a mechanical principle.

As a prior art literature pertinent to this kind of cooling system for an engine, there already exists, for example, the following Patent Literature 1.

CITATION LIST

Patent Literature

[Patent Literature 1] JP 2003-278544A

SUMMARY OF INVENTION

Technical Problems

Recently obliged in countries is equipment of an onboard diagnosis device (OBD) to a vehicle to monitor any failure in an exhaust gas countermeasure system; upon failure occurrence, it turns on a warning light or the like for announcement of the failure occurrence to a driver and records details of the failure. Diagnosis of failure in the thermostat has been also desired.

Specifically, most of various exhaust gas countermeasure systems work normally under a condition of an engine having been warmed up well. For example, in so-called exhaust gas recirculation (EGR) where part of exhaust gas is extracted from an exhaust side, is cooled by an EGR cooler and is returned to an intake side, combustion of fuel in an engine being suppressed by the exhaust gas returned to the intake side to lower a combustion temperature and thus reduce $NO_x$ produced, control is made under a condition of the engine being cold at cold startup such that the recirculation of the exhaust gas is stopped to preferentially warm up the engine.

Thus, when any failure of the thermostat results in no closing of the cooling-water circulation passage to the radiator at cold startup, warm-up of the engine becomes time-consuming, leading to elongation of a time period during which the exhaust gas countermeasure system cannot work normally. This triggers a review of necessity of failure detection of the thermostat about which no failure detection has been made at all up to the present.

The invention was made in view of the above and has its object to provide a thermostat failure judgment device which can monitor engine warm-up performance at cold startup to detect any failure of a thermostat.

Solution to Problems

The invention is directed to a failure judgment device for a thermostat arranged in a cooling-water circulation passage in an engine, characterized by comprising a water-temperature sensor for detecting a temperature of cooling water having passed through the engine and a controller for monitoring rise in temperature of cooling water at cold startup through a detection signal inputted from said water-temperature sensor and for calculating predicted water temperature of the engine as from beginning of the startup to judge failure of the thermostat when said predicted temperature reaches a valve opening temperature of the thermostat with the temperature of the cooling water being not beyond a threshold value, said controller calculating all together a heat quantity transferring from respective cylinders in said engine to the cooling water on the basis of information on a revolution speed of the engine and a fuel injection amount, and a heat loss of the cooling water cooled in contact with ambient air on the basis of information on the revolution speed of the engine, a car speed, an intake air temperature and a temperature of the cooling water, determining an eventual heat quantity obtained by the cooling water through subtraction of the heat loss of the cooling water cooled, said determined heat quantity being converted to raised temperature of the cooling water which in turn is added to an actually measured value of the cooling water at the beginning of the startup to determine the predicted water temperature.

Thus, in this manner, the rise in temperature of the cooling water at the cold startup is monitored by the controller on the basis of the detection signal from the water-temperature sensor and, at the same time, the predicted water temperature of the engine as from the beginning of the startup is calculated by the controller. Failure of the thermostat is judged by the controller when the predicted water temperature reaches a valve opening temperature of the thermostat with the temperature of the cooling water being not beyond a threshold value.

Specifically, if the thermostat works normally, it is natural that the temperature of the cooling water is beyond the threshold value when the predicted water temperature in the engine reaches the valve opening temperature of the thermostat; it is deduced that the temperature of the cooling water being not beyond the threshold value means failure of the thermostat, leading to no closing of the cooling-water circulation passage to the radiator.

When the engine is provided with a water-cooled EGR cooler, it is preferable that the controller is adapted to add an absorbed heat quantity in said EGR cooler in the calculation of the predicted water temperature on the basis of information on the revolution speed of the engine and an opening degree of an EGR valve.

Advantageous Effects of Invention

A thermostat failure judgment device of the invention as mentioned in the above, which can monitor warm-up performance of the engine at cold startup to detect any failure of the thermostat, can have excellent effects that repair or other action can be immediately made upon failure occurrence of the thermostat and that early settleable is elongation of a time period, due to time-consuming warm-up of the engine, during which the exhaust gas countermeasure system cannot work normally.

DESCRIPTION OF EMBODIMENT

An embodiment of the invention will be described in conjunction with the drawings.

Figure 1:
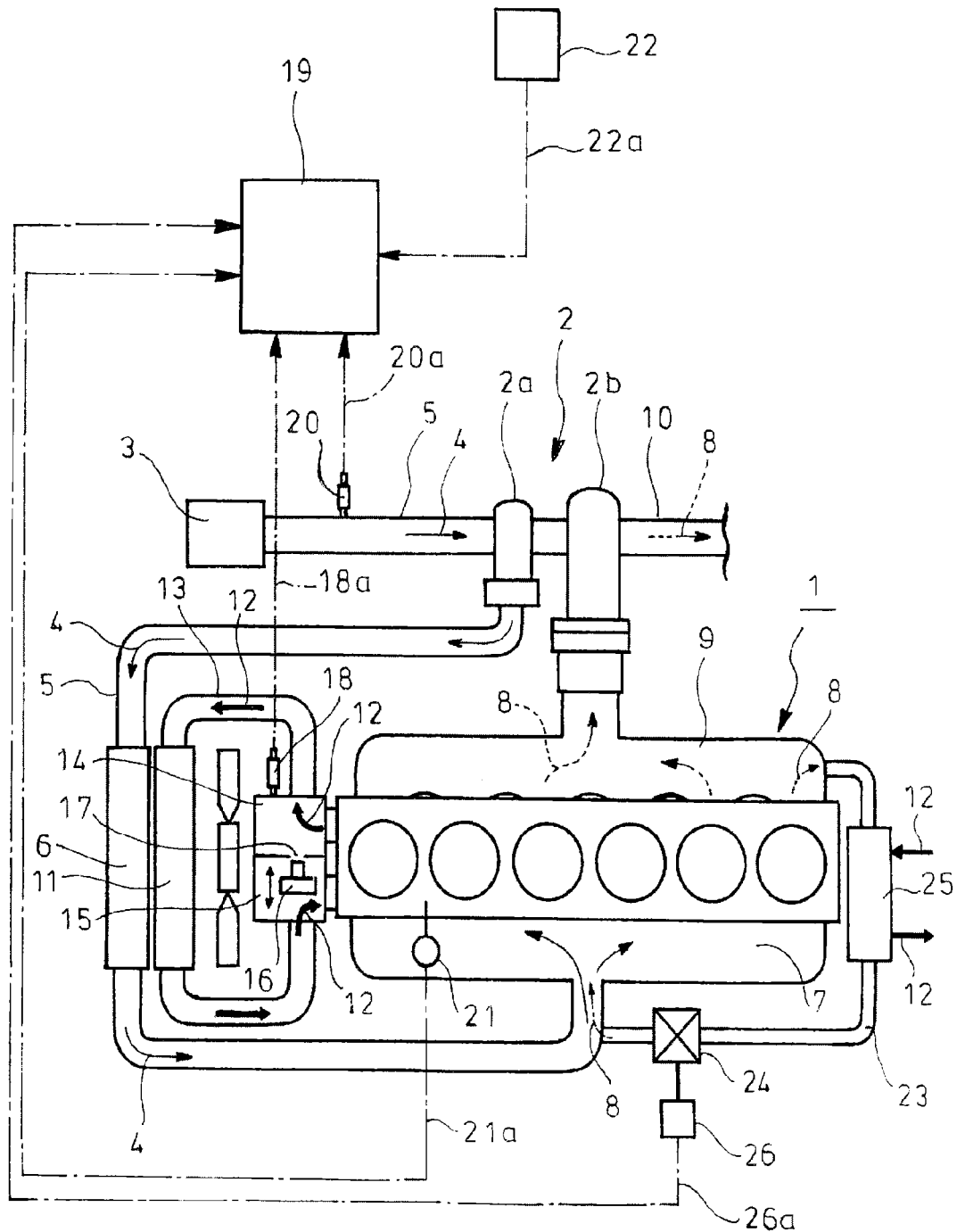
FIG. 1 is a schematic view showing an embodiment of the invention.

FIGS. 1-4 show the embodiment of the invention. In FIG. 1, reference numeral 1 denotes an engine which is a diesel engine with a turbocharger 2. Intake air 4 introduced through an air cleaner 3 is fed through an intake pipe 5 to a compressor 2a of the turbocharger 2. The intake air 4 pressurized by the compressor 2a is fed to an intercooler 6 where it is cooled. The cooled intake air 4 is further fed to a suction manifold 7 where it is distributed to respective cylinders of the engine 1. Exhaust gas 8 discharged through the respective cylinders of the engine 1 is fed through an exhaust manifold 9 to a turbine 2b of the turbocharger 2. The exhaust gas 8 having driven the turbine 2b is discharged outside of the vehicle through an exhaust pipe 10.

Arranged between the engine 1 and a radiator 11 is a circulation passage 13 for circulation of cooling water 12 therebetween. In the circulation passage 13, the cooling water 1 elevated in temperature through water-cooling of the engine 1 is extracted to an outlet 14 and is returned from the outlet 14 through the radiator 11 to an inlet 15.

The inlet 15 in the circulation passage 13 to the engine 1 is provided with a thermostat 16 for closing of water channel for the cooling water 12 returned through the radiator 11 to the inlet 15. When the cooling water 12 is low-temperature, the thermostat 16 operates to close the water channel of returning the cooling water 12 from the radiator 11 to the engine 1 and open a bypass port 17 for communication of the inlet 15 with the outlet 14, thereby preferentially warming up the engine 1 through circulation of the cooling water 12 not by way of the radiator 11.

Shown in the illustrated embodiment is an inlet control mode where the thermostat 16 is arranged in the inlet 15 to the engine 1. Of course, alternatively applicable is an outlet control mode where the thermostat 16 is arranged in the outlet 14 from the engine 1.

The inlet 15 is provided with a water-temperature sensor 18 for detection in temperature of the cooling water 12 having passed through the engine 1. A detection signal 18a from the water-temperature sensor 18 is inputted to a controller 19 constituting an engine-controlling computer (ECU: Electronic Control Unit). In the controller 19, rise in temperature of the cooling water 12 at cold startup is monitored on the basis of the detection signal 18a from the water-temperature sensor 18, and a predicted water temperature of the engine 1 as from beginning of the startup is calculated; failure of the thermostat 16 is judged in a case where the predicted water temperature reaches a valve opening temperature of the thermostat 16 with the temperature of the cooling water 12 being not beyond a threshold value.

Figure 2:
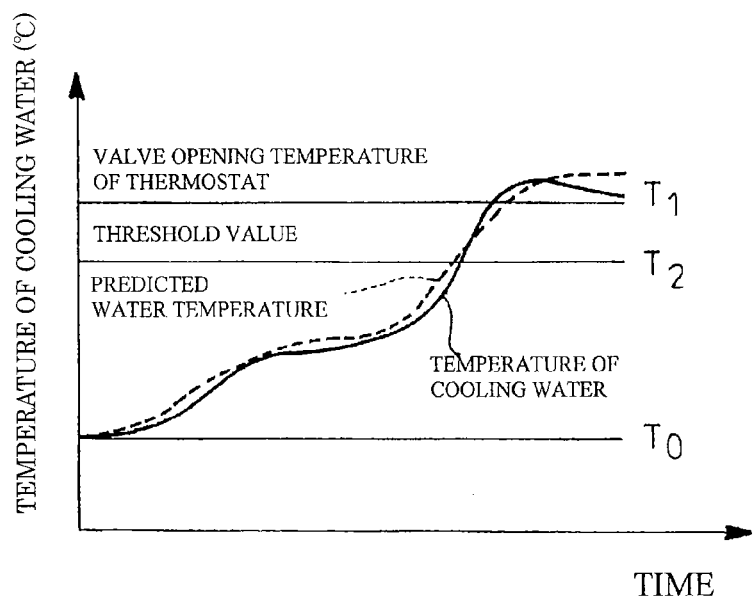
FIG. 2 is a graph showing a relationship between predicted water temperature and actually measured value of cooling water in a normal condition.

Specifically, when the thermostat 16 operates normally as shown in the graph in FIG. 2, the predicted water temperature shown as dotted curve in FIG. 2 and the temperature of the cooling water 12 (actually measured value by the water-temperature sensor 18) shown as solid-line curve in FIG. 2 change without great disjunction with each other. As shown in the graph in FIG. 3, if the predicted water temperature reaches the valve opening temperature of the thermostat 16 with the temperature of the cooling water 12 being not beyond the threshold value, it is deduced that thermostat 16 has failure and the circulation passage 13 of the cooling water 12 to the radiator 11 remains not closed.

In the controller 19, which also controls a fuel injection system to the engine 1, information on fuel injection amount is always grasped. Also inputted to the controller are a detection signal 20a from an air temperature sensor 20 for detection of a temperature of the intake air 4, a detection signal 21a from a revolution speed sensor 21 for detection of a revolution speed of the engine 1 and a detection signal 22a from a speed sensor 22 for detection of a car speed.

Further, in the embodiment shown in FIG. 1, the exhaust manifold 9 is connected through an EGR pipe 23 to the intake pipe 5 at a position near an inlet to the suction manifold 7. The EGR pipe 23 is provided with an EGR valve 24 an opening degree of which is adjustable to adjust a recirculation amount of the exhaust gas 8 and with a water-cooled EGR cooler 25 which cools the recirculated exhaust gas 8. The opening degree of the EGR valve 24 is detected by an opening degree sensor 26 and inputted as detection signal 26a to the controller 19.

Though a detailed illustration of a piping system is omitted, part of the cooling water 12 used for cooling of the engine 1 is extracted for use as cooling medium to the EGR cooler 25. The cooling water 12 elevated in temperature through heat exchange with the recirculated exhaust gas 8 is returned together with the cooling water 12 having passed through the engine 1 to the circulation passage 13 through the outlet 14.

An explanation on calculation procedure of predicted water temperature in the controller 19 will be complemented. As shown in the block diagram in FIG. 4, in step S1, a heat quantity transferring from the respective cylinders of the engine 1 to the cooling water 12 is calculated on the basis of information on the revolution speed of the engine 1 and a fuel injection amount. Concurrently, in step S2, an absorbed heat quantity in the EGR cooler is calculated on the basis of information of the revolution speed of the engine 1 and an opening degree of the EGR valve 24 and, in step S3, heat loss of the cooling water 12 cooled in contact with ambient air is calculated on the basis of information on the revolution speed of the engine 1, a car speed, an intake-air temperature (temperature of the intake air 4) and the temperature of the cooling water 12.

Then, in step S4, an eventual heat quantity obtained by the cooling water 12 is calculated by subtracting the heat loss of the cooling water 12 cooled in contact with the ambient air which is derived in step S3 from the absorbed heat quantities of the respective cylinders in the engine 1 and the EGR cooler 25 derived in the previous steps S1 and S2. In step S5, the heat quantity derived in the previous step S4 is converted into a raised temperature of the cooling water 12. Next, in step S6, the raised temperature converted in the previous step S5 is added to the actually measured value of the cooling water 12 at the beginning of the startup to obtain the predicted water temperature.

Thus, in this manner, rise in temperature of the cooling water 12 at the cold startup is monitored by the controller 19 on the basis of the detection signal 18a from the water-temperature sensor 18 and the predicted water temperature of the engine 1 as from the beginning of the startup is calculated by the controller 19. When the predicted water temperature reaches the valve opening temperature of the thermostat 16 with the temperature of the cooling water 12 being not beyond the threshold value, failure of the thermostat 16 is judged by the controller 19.

Figure 3:
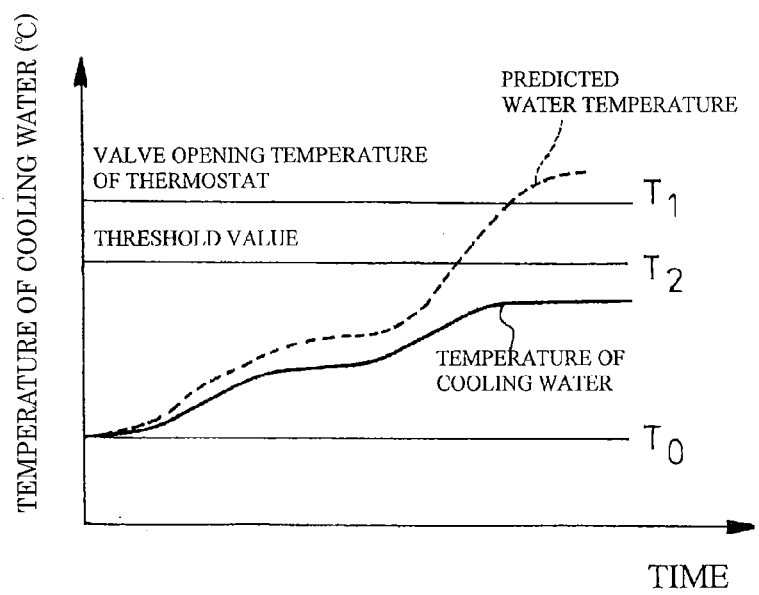
FIG. 3 is a graph showing a relationship between predicted water temperature and actually measured value of cooling water upon failure occurrence.
Figure 4:
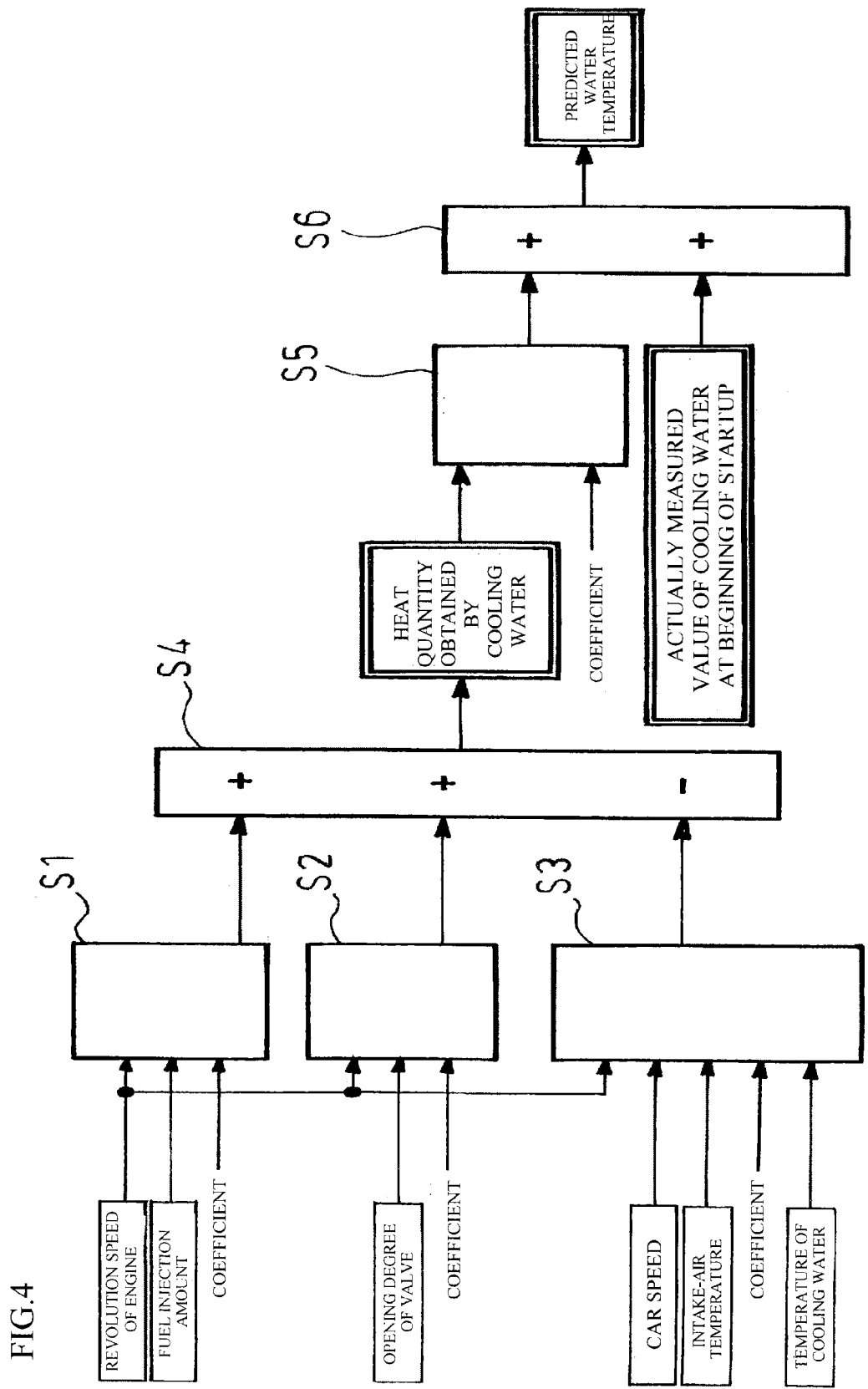
FIG. 4 is a block diagram for explanation on calculation procedure of predicted water temperature.

Specifically, as shown in the graph of FIG. 2, when the temperature of the cooling water 12 at the beginning of the startup is $T_0$ and the thermostat 16 operates normally, the predicted water temperature shown as dotted curve in FIG. 2 and the temperature of the cooling water (actually measured value by the water-temperature sensor 18) shown as solid-line curve in FIG. 2 rise without great disjunction with each other; naturally, the predicted water temperature reaches the valve opening temperature $T_1$ of the thermostat 16 with the temperature of the cooling water 12 being beyond the threshold value $T_2$. As shown in the graph of FIG. 3, when the temperature of the cooling water 12 (actually measured value by the water-temperature sensor 18) shown as solid-line curve in FIG. 3 becomes disjunct downward greatly relative to the predicted water temperature, the predicted water temperature reaches the valve opening temperature $T_1$ of the thermostat 16 with the temperature of the cooling water 12 remaining in a temperature range not beyond the threshold value $T_2$; it is then deduced that thermostat 16 has failure and the circulation passage 13 of the cooling water 12 to the radiator 11 remains not closed.

Thus, according to the above embodiment, warm-up performance of the engine 1 at cold startup can be monitored to detect any failure of the thermostat 16. As a result, repair or other action can be immediately made upon failure occurrence of the thermostat 16. Early settleable is elongation of a time period, due to time-consuming warm-up of the engine 1, during which the exhaust gas countermeasure system cannot work normally.

REFERENCE SIGNS LIST

1 engine
4 intake air
12 cooling water
13 circulation passage
16 thermostat
18 water-temperature sensor
18*a* detection signal
19 controller
20 air temperature sensor
20*a* detection signal
21 revolution speed sensor
21*a* detection signal
22 speed sensor
22*a* detection signal
23 EGR pipe
24 EGR valve
25 EGR cooler
26 opening degree sensor
26*a* detection signal

The invention claimed is:

1. A failure judgment device for a thermostat arranged in a cooling-water circulation passage in an engine, comprising:
   a water-temperature sensor to detect a temperature of cooling water having passed through the engine; and
   a controller configured to:
      monitor a rise in temperature of the cooling water at cold startup through a detection signal inputted from said water-temperature sensor,
      to calculate a predicted water temperature of the engine as from a beginning of the cold startup to judge failure of the thermostat when said predicted water temperature reaches a valve opening temperature of the thermostat with the temperature of the cooling water being not beyond a threshold value,
      to calculate all together
         a heat quantity transferring from respective cylinders in said engine to the cooling water on the basis of information on a revolution speed of the engine and a fuel injection amount, and
         a heat loss of the cooling water cooled in contact with ambient air on the basis of information on the revolution speed of the engine, a car speed, an intake air temperature, and a temperature of the cooling water, and
      to determine an eventual heat quantity obtained by the cooling water through subtraction of the heat loss of the cooling water cooled, said determined heat quantity being converted to a raised temperature of the cooling water which in turn is added to an actually measured value of the cooling water at the beginning of the cold startup to determine the predicted water temperature, wherein
   the engine is provided with a water-cooled EGR cooler, and
   the controller is configured to add an absorbed heat quantity in said water-cooled EGR cooler in the calculation of the predicted water temperature on the basis of information on the revolution speed of the engine and an opening degree of an EGR valve.

* * * * *